United States Patent
Thawani et al.

(10) Patent No.: US 11,225,122 B2
(45) Date of Patent: Jan. 18, 2022

(54) HVAC MOTOR MOUNT FOR NOISE SUPPRESSION

(71) Applicant: DENSO International America, Inc., Southfield, MI (US)

(72) Inventors: Prakash Thawani, Bloomfield Hills, MI (US); Stephen Sinadinos, Commerce Township, MI (US); Joseph Burtch, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 152 days.

(21) Appl. No.: 16/560,116

(22) Filed: Sep. 4, 2019

(65) Prior Publication Data

US 2021/0061059 A1 Mar. 4, 2021

(51) Int. Cl.
*B60H 1/00* (2006.01)

(52) U.S. Cl.
CPC ... *B60H 1/00471* (2013.01); *B60H 2001/006* (2013.01)

(58) Field of Classification Search
CPC .......... B60H 1/00471; B60H 2001/006; B60H 1/00428; B60H 1/00535; F04D 29/668; F04D 29/441; F04D 29/4213; F04D 25/082

See application file for complete search history.

(56) References Cited

U.S. PATENT DOCUMENTS

| | | | |
|---|---|---|---|
| 2,444,966 A * | 7/1948 | Troller | F04D 19/002 417/423.14 |
| 4,200,257 A * | 4/1980 | Litch, III | H02K 5/24 248/604 |
| 4,252,502 A | 2/1981 | Scheidel | |
| 5,492,456 A * | 2/1996 | Knight | F04D 29/626 248/604 |
| 5,803,721 A * | 9/1998 | Lee | F04D 29/281 417/423.14 |
| 6,382,305 B1 * | 5/2002 | Sano | B60H 3/0608 165/103 |
| 6,406,275 B1 | 6/2002 | Hoehn | |
| 7,227,287 B2 * | 6/2007 | Noda | F04D 25/082 310/68 R |
| 8,292,575 B2 * | 10/2012 | Kim | F04D 25/064 415/204 |
| 8,876,092 B2 * | 11/2014 | Wojcieson | H02K 5/24 267/136 |
| 9,739,287 B2 | 8/2017 | Cocks et al. | |
| 10,125,790 B2 | 11/2018 | Pettitt | |
| 2007/0123159 A1 * | 5/2007 | Venkatappa | B60H 1/00685 454/139 |

(Continued)

*Primary Examiner* — Emmanuel E Duke
(74) *Attorney, Agent, or Firm* — Harness, Dickey & Pierce, P.L.C.

(57) ABSTRACT

A blower assembly for an airflow medium, such as in a heating, ventilation, and air conditioning (HVAC) system. The blower assembly has a case defining an airflow inlet and an airflow outlet. An airflow generator is mounted within the case. Rotation of the airflow generator draws airflow into the case through the airflow inlet, directs airflow through the case, and pushes airflow out of the case through the airflow outlet. The motor is entirely within the case and is mounted on an upstream side of the airflow generator with respect to direction of airflow produced by the airflow generator through the case.

12 Claims, 8 Drawing Sheets

(56) References Cited

U.S. PATENT DOCUMENTS

2014/0205450 A1\* 7/2014 Cocks ................... F04D 17/16
                                                                415/213.1
2015/0159661 A1    6/2015   Zahora
2016/0084268 A1    3/2016   Cocks et al.

\* cited by examiner

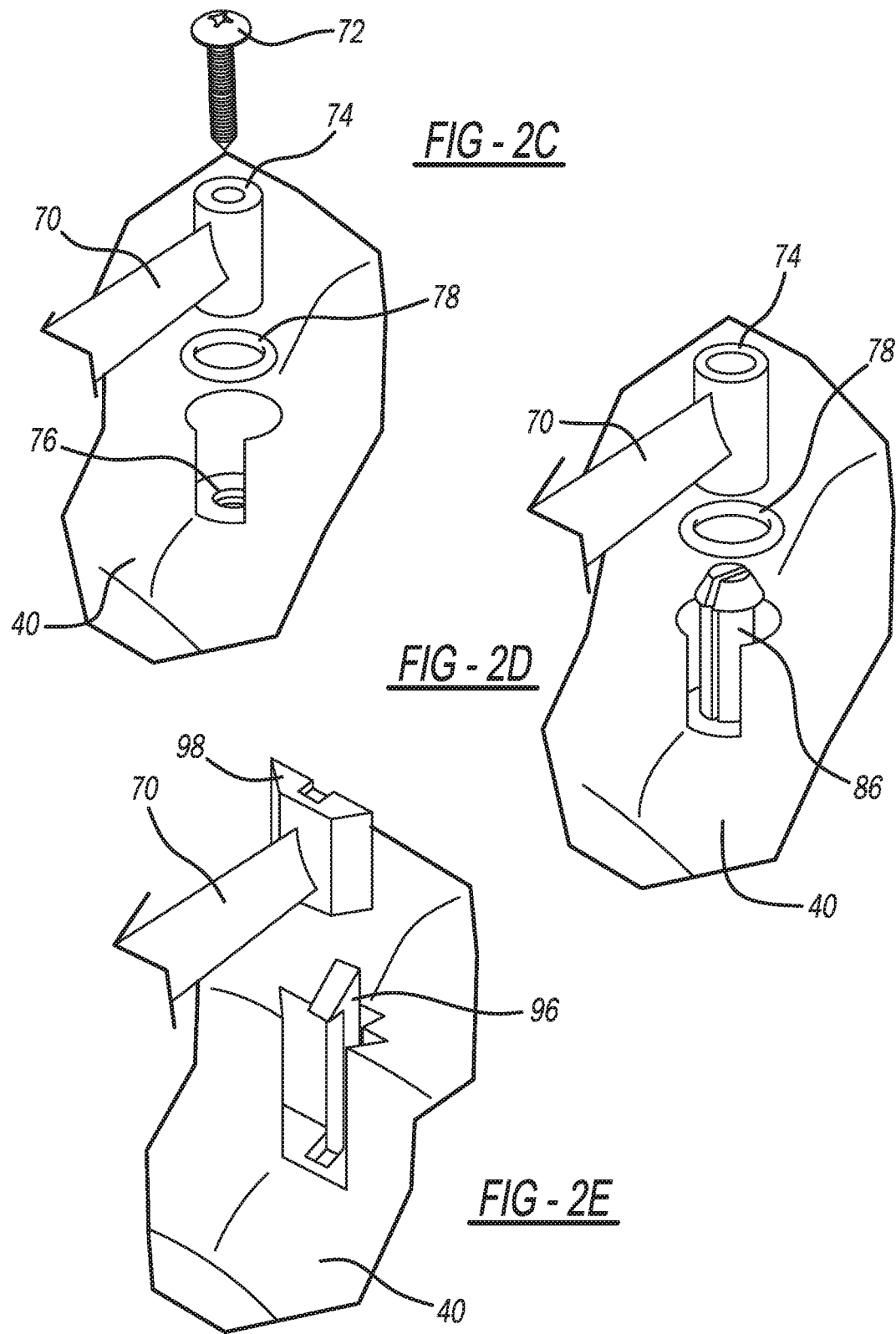

HVAC MOTOR MOUNT FOR NOISE SUPPRESSION

FIELD

The present disclosure relates to a heating, ventilation, and air conditioning (HVAC) system motor mount that reduces motor noise and airflow noise.

BACKGROUND

This section provides background information related to the present disclosure, which is not necessarily prior art.

Motor driven airflow generators, such as centrifugal rotors/wheels and fans, are often used in automotive heating, ventilation, and air conditioning (HVAC) systems. Motor induced noise at low speeds is easily perceived by occupants of the vehicle passenger cabin due to the close proximity of current airflow generator motors to the passenger cabin. Current motors are arranged outside of the HVAC casing, or extend out from within the casing. Current motors are often arranged under the glove box, for example. Thus, ticking and whining/whistles produced by current motors can be readily heard at low and medium-low speeds. Current motors are often covered with a hush panel to hide the motors and deflect induced noise. Such panels undesirably add cost and complexity.

SUMMARY

This section provides a general summary of the disclosure, and is not a comprehensive disclosure of its full scope or all of its features.

The present disclosure includes a blower assembly for airflow medium such as in a heating, ventilation, and air conditioning (HVAC) system. The blower assembly has a case defining an airflow inlet and an airflow outlet. An airflow generator is mounted within the case. The airflow generator draws airflow into the case through the airflow inlet, directs airflow through the case, and pushes airflow out of the case through the airflow outlet. The motor is entirely within the case and is mounted on an upstream side of the airflow generator with respect to direction of airflow produced by the airflow generator through the case.

The present disclosure further includes a blower assembly of a heating, ventilation, and air conditioning (HVAC) system for a vehicle. The blower assembly has a case defining a fresh air inlet configured to receive airflow from outside of the vehicle, and a recirculation air inlet configured to receive airflow from inside of a passenger cabin of the vehicle. Within the case is an airflow generator and a motor for rotating the airflow generator. The motor is entirely within the case between the airflow generator and each of the fresh air inlet and the recirculation air inlet. A motor support supports the motor over the airflow generator in a path of airflow to the airflow generator. The motor support is connected to the case with at least one coupler.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2C illustrates an exemplary coupling between the motor mount and a case of the blower assembly;

FIG. 2D illustrates an additional exemplary coupling between the motor mount and the case of the blower assembly;

FIG. 2E illustrates another exemplary coupling between the motor mount and the case of the blower assembly;

Corresponding reference numerals indicate corresponding parts throughout the several views of the drawings.

DETAILED DESCRIPTION

Figure 1:
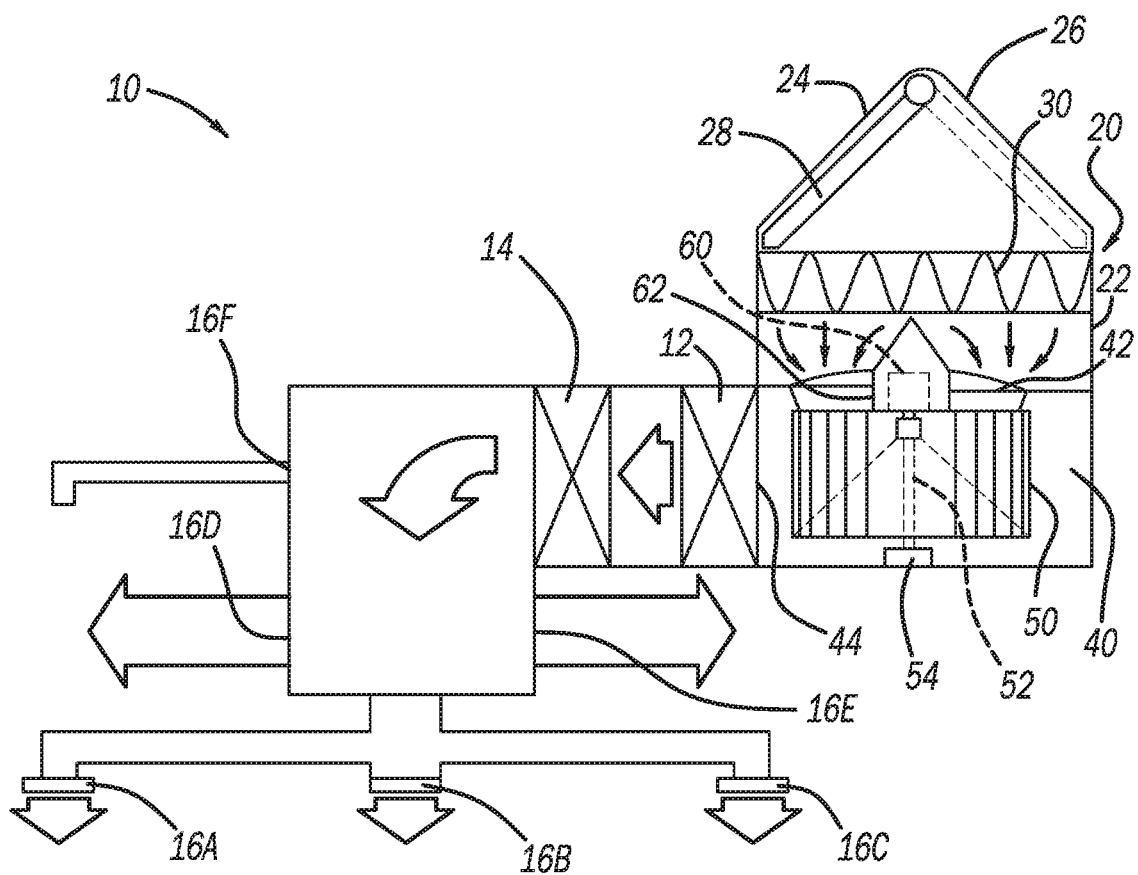
FIG. 1 illustrates an exemplary heating, ventilation, and air conditioning (HVAC) system including an exemplary blower assembly in accordance with the present disclosure, the blower assembly may include any suitable airflow generator, such as any suitable wheel, rotor, fan, etc.

Example embodiments will now be described more fully with reference to the accompanying drawings.

While current heating, ventilation, and air conditioning (HVAC) blowers are suitable for their intended use, they are subject to improvement. With initial reference to FIG. 1, the present disclosure advantageously provides for an HVAC system 10 including a blower assembly 20. As compared to current HVAC blowers, the blower assembly 20 generates less passenger cabin noise for at least the reasons set forth herein. Furthermore and as explained herein, the blower assembly 20 is "self-cooling," and thus eliminates any need for a cooling tube/or channel to cool motor 60, which is in contrast to existing HVAC blowers. The present disclosure also likely eliminates any need for a hush panel, which advantageously reduces costs and simplifies manufacturing and installation. The blower assembly 20 is not limited to use with the HVAC system 10. The blower assembly 20 may be used as a fluid flow/airflow generator in any other system as well. For example, the blower assembly 20 may be used with any suitable fluid pump, natural gas pump, oil pump, humidifier etc.

The HVAC system 10 may be included with any suitable vehicle HVAC system. The HVAC system 10 may be installed in any suitable vehicle, such as any suitable passenger vehicle, mass transit vehicle, recreational vehicle, utility vehicle, military equipment, construction equipment, watercraft, aircraft, etc. The HVAC system 10 includes the blower assembly 20. The blower assembly 20 generates and directs airflow to an evaporator 12 and a heater core 14 of the HVAC system 10 for cooling or heating the airflow. After the airflow has been cooled or heated, the airflow is directed to one or more outlets 16A-16F of the HVAC system 10 to distribute the airflow to select areas of the passenger cabin (and/or the windshield/side windows during a defrost mode).

With continued reference to FIG. 1 and additional reference to FIG. 2A and FIG. 2B, the blower assembly 20 will now be described in additional detail. The blower assembly 20 includes a case 22 defining a recirculation air inlet 24 and a fresh air inlet 26. The recirculation air inlet 24 is arranged to receive airflow from within the passenger cabin of the vehicle. The fresh air inlet 26 is arranged to receive airflow from outside of the vehicle. Airflow is directed to each one of the inlets 24 and 26 in any suitable manner, such as by way of any suitable air duct arrangement.

An inlet control door 28 is movable to control airflow into the case 22 through the inlets 24 and 26. For example, the inlet control door 28 may be arranged to block the recirculation air inlet 24 (as illustrated in FIG. 1) so that only fresh air from outside of the vehicle is able to flow into the blower assembly 20 through the fresh air inlet 26. The inlet control door 28 may be arranged to block or close the fresh air inlet 26, such that only recirculated airflow from within the passenger cabin flows into the blower assembly 20 through the recirculation air inlet 24. The inlet control door 28 may also be arranged between the inlets 24 and 26 to allow a mixture of airflow into the blower assembly 20 through both the inlet 24 and the inlet 26. The case 22 may include a filter 30, which filters the airflow.

Figure 2H:
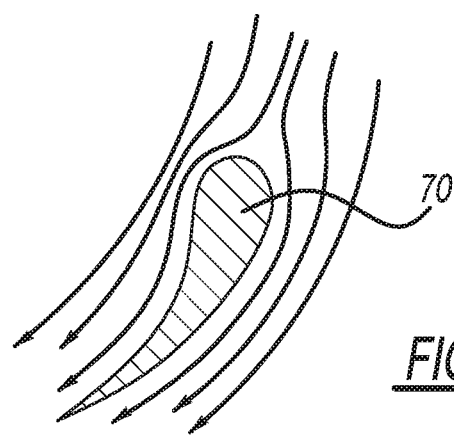
FIG. 2H is a cross-sectional view taken along line 2H-2H of FIG. 2A.
Figure 2A:
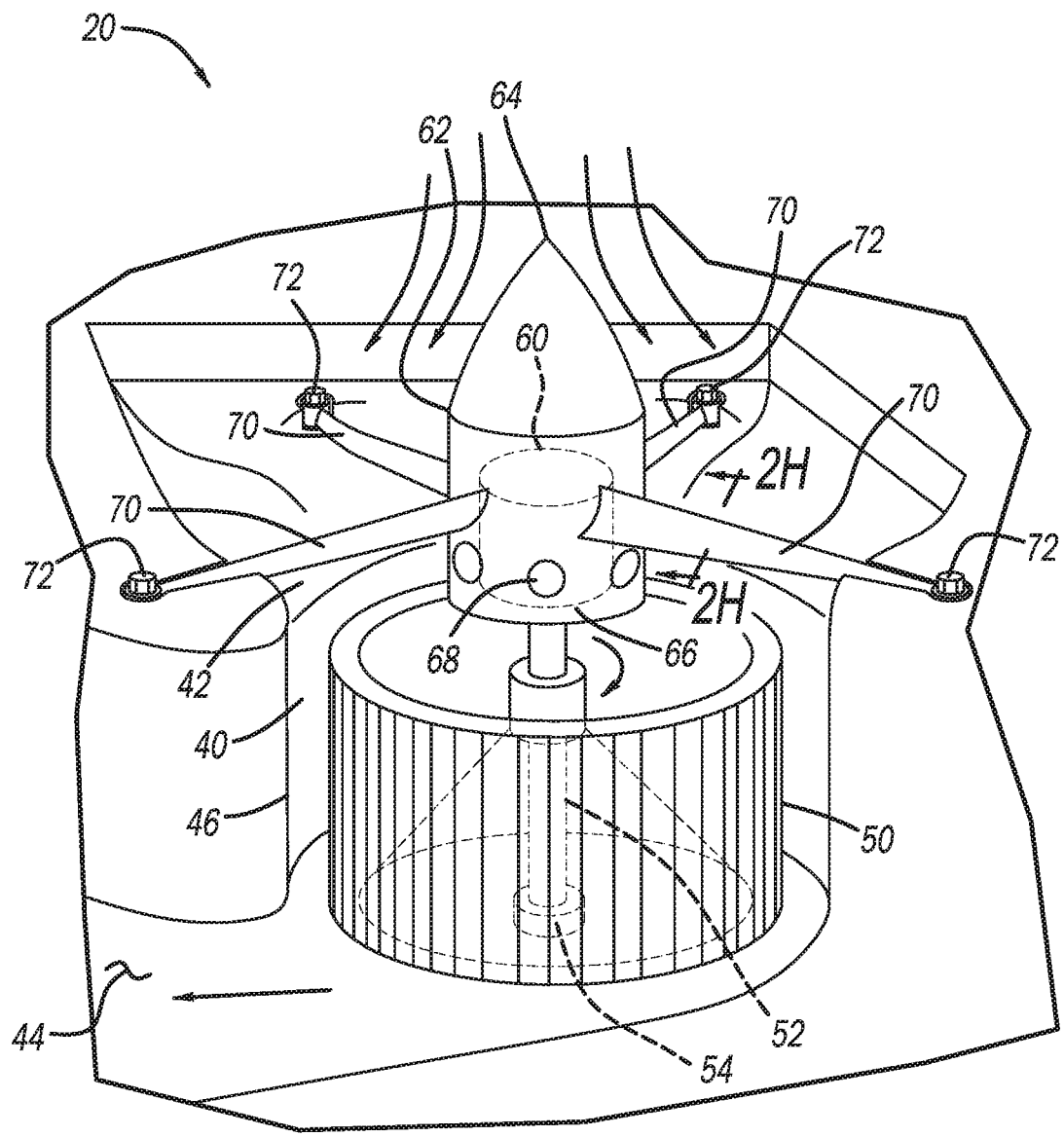
FIG. 2A illustrates an exemplary motor mount for the blower assembly of FIG. 1 in accordance with the present disclosure.
Figure 2B:
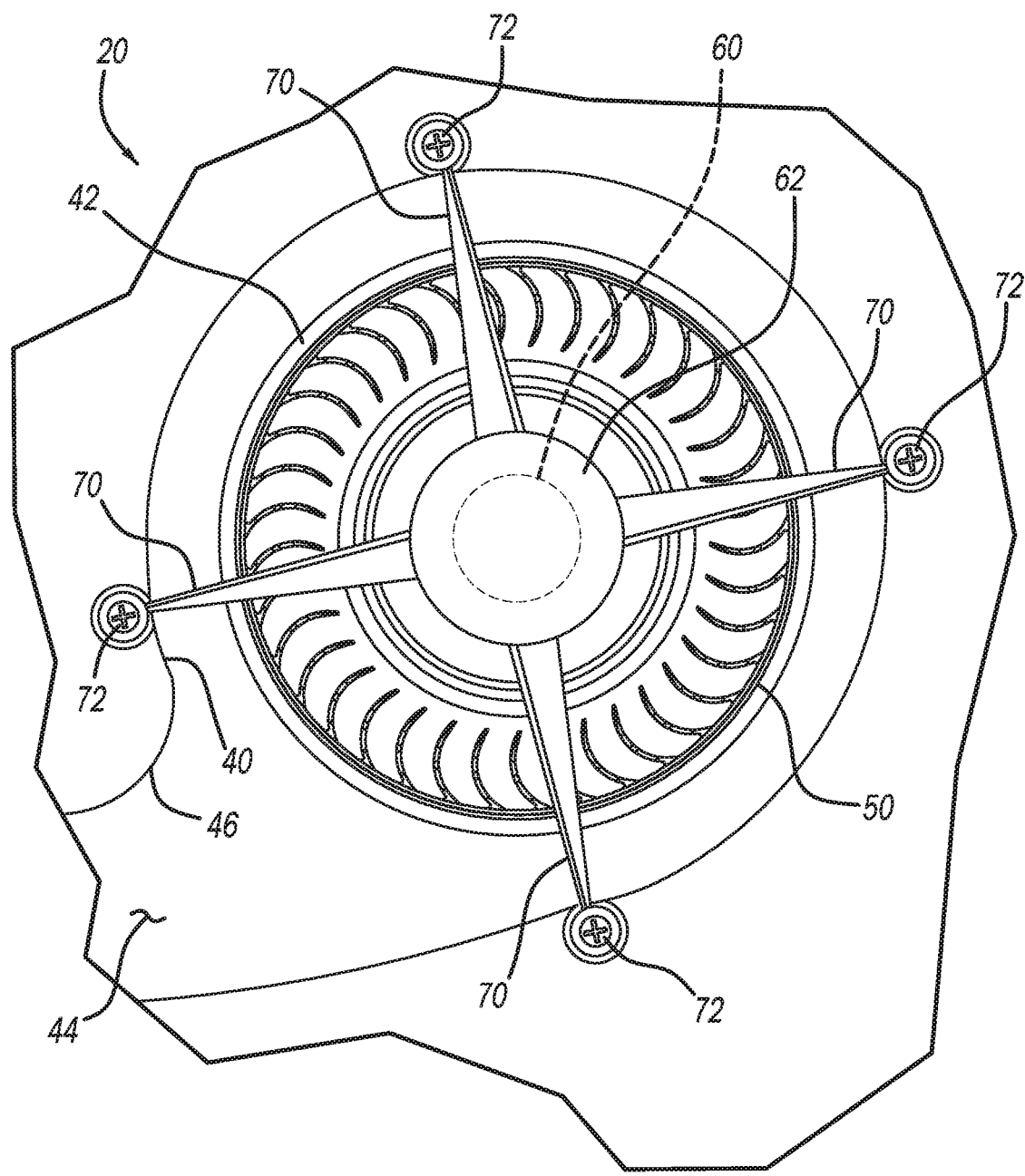
FIG. 2B is a plan view of FIG. 2A.

The case 22 includes an airflow generator housing 40, which may be a scroll-type housing as illustrated (see FIG. 2B for plan view). The airflow generator housing 40 may be any other suitable housing as well. The airflow generator housing 40 defines an inlet 42 and an outlet 44. The inlet 42 to the airflow generator housing 40 receives airflow from the recirculation air inlet 24 and the fresh air inlet 26. In the example illustrated, the outlet 44 of the airflow generator housing 40 is oriented at an angle of 90° relative to the inlet 42 of the airflow generator housing 40. The inlet 42 and the outlet 44 of the airflow generator housing 40 may be arranged at any other suitable relative orientation as well. The outlet 44 of the airflow generator housing 40 is connected to, by way of any suitable ducting, the evaporator 12 and the heater core 14 such that airflow exiting the airflow generator housing 40 flows to the evaporator 12 and then the heater core 14. When configured as a scroll case, the airflow generator housing 40 includes a scroll nose 46 (see FIG. 2A, FIG. 2B, and FIG. 3) between the inlet 42 and the outlet 44.

Within the airflow generator housing 40 is the airflow generator 50. The airflow generator 50 may be any suitable airflow generator, such as any suitable rotor, wheel, fan, etc. The airflow generator 50 is connected to any suitable shaft 52, which is seated within a bearing 54. The bearing 54 is on a side of the airflow generator 50 opposite to the blower case inlet 42, and thus the bearing 54 is on a downstream side of the airflow generator 50. The bearing 54 allows the shaft 52 to rotate within the bearing 54, and provides a support for the airflow generator 50.

The motor 60 rotates the airflow generator 50 by rotating the shaft 52. Rotation of the airflow generator 50 by the motor 60 draws airflow into the case 22 through one or more of the recirculation air inlet 24 and the fresh air inlet 26 based on the position of the inlet control door 28. The airflow then flows through the filter 30 and to the airflow generator 50. The airflow generator 50 directs the airflow through the case 22 and pushes the airflow out of the case 22 through the outlet 44.

With reference to FIGS. 1, 2A, and 2B the motor 60 is seated within a motor housing 62. The motor housing 62 has an upstream end 64, which is upstream with respect to the direction of airflow through the case 22. The upstream end 64 may have any suitable shape to produce laminar airflow. For example, the upstream end 64 may be pointed, rounded, egg-shaped, etc. Airflow to the airflow generator 50 passes over the motor housing 62 and the upstream end 64 thereof, which advantageously helps to make the airflow laminar. Laminar airflow to the airflow generator 50 results in the blower assembly 20 generating less noise than existing blower assemblies as perceived by occupants of the vehicle.

The motor housing 62 may define inlets 68, through which airflow enters the motor housing 62 to cool the motor 60. Thus unlike existing motors, there is no need for an additional cooling tube to direct air to the motor 60 to cool the motor 60. The elimination of an additional cooling tube advantageously reduces the cost of the blower assembly 20 and simplifies assembly. Furthermore, eliminating the cooling tube makes the blower assembly 20 relatively quieter than existing assemblies because such cooling tubes have been found to generate and transmit undesirable noise. This may also eliminate any need for a hush panel resulting in additional cost savings.

The motor 60 is arranged entirely within the case 22 on an upstream side of the airflow generator 50 with respect to direction of airflow generated by the airflow generator 50 through the case 22. The motor 60 is between the airflow generator 50 and the air inlets 24 and 26. The position of the motor 60 is in contrast to existing motors, which are arranged on a downstream side of the airflow generator with at least a portion of the motor outside of the case. Arranging the motor 60 entirely within the case 22 on an upstream side of the airflow generator 50 advantageously positions the motor 60 further from the passenger cabin of the vehicle as compared to existing motors arranged on the downstream side of the airflow generator 50. Because the motor 60 is located relatively further from the passenger cabin, noise generated by the motor 60 will be less audible to occupants of the vehicle passenger cabin as compared to existing motors arranged downstream of the airflow generator. In particular, motor ticking and whining/whistles sometimes generated at low and medium-low blower speeds will be less audible to the vehicle occupants. Furthermore, positioning the motor 60 in this manner may eliminate the need for a hush-panel, which is often used with existing motors, to deflect noise induced by the motor 60.

The motor 60 may be mounted on the upstream side of the airflow generator 50 between the airflow generator 50 and the inlets 24, 26 in any suitable manner with any suitable motor support 70. For example and as illustrated in FIGS. 2A and 2B, the motor 60 may be mounted with a plurality of motor supports 70. Four motor supports 70 are illustrated to support the motor 60 on the upstream side of the airflow generator 50. However, any suitable number of motor supports 70 may be used. The motor supports 70 extend outward from the motor housing 62 of the motor 60 to any suitable mounting location within the case 22, such as to the airflow generator housing 40. The motor supports 70 are mounted to the airflow generator housing 40 in any suitable manner with any suitable coupling arrangement or device.

With continued reference to FIGS. 2A and 2B, and additional reference to FIG. 2C, an exemplary coupling arrangement is illustrated in which one or more of the motor supports 70 are mounted to the airflow generator housing 40 with a suitable coupler, such as a fastener 72. With particular reference to FIG. 2C, the fastener 72 extends through a sleeve 74 at an end of the motor support 70, and into engagement with a receptacle 76 defined by the airflow generator housing 40. To damp the vibrations generated by the motor 60, and reduce the amount of noise generated by the motor 60, any suitable vibration damping may be included at the mounting location of the motor supports 70, such as at the interface between the motor supports 70 and the airflow generator housing 40. For example and as illustrated in FIG. 2C, polymeric grommets 78 may be arranged between the sleeve 74 and the airflow generator housing 40 such that the fasteners 72 extend through the grommets 78. Thus, the grommets 78 decouple or isolate the vibrations between the motor supports 70 and the airflow generator housing 40 of the case 22.

With reference to FIG. 2D, instead of the fastener 72, a coupler in the form of a pair of flexible tabs 86 at the airflow generator housing 40 may be used to secure the motor support 70 to the airflow generator housing 40. The sleeve 74 is pressed onto and over the pair of flexible tabs 86 to lock the particular motor support 70 to the airflow generator housing 40. The polymeric grommet 78 may be arranged in any suitable manner to isolate vibrations between the motor supports 70 and the airflow generator housing 40.

With reference to FIG. 2E, the pair of flexible tabs 86 may be replaced with a single flexible tab 96. At the end of the motor support 70 is a tab interface 98 suitable for cooperating with the single flexible tab 96 to secure the motor support 70 to the airflow generator housing 40. Any suitable grommet may be included at the interface to dampen vibrations between the motor support 70 and the airflow generator housing 40.

Figure 2F:
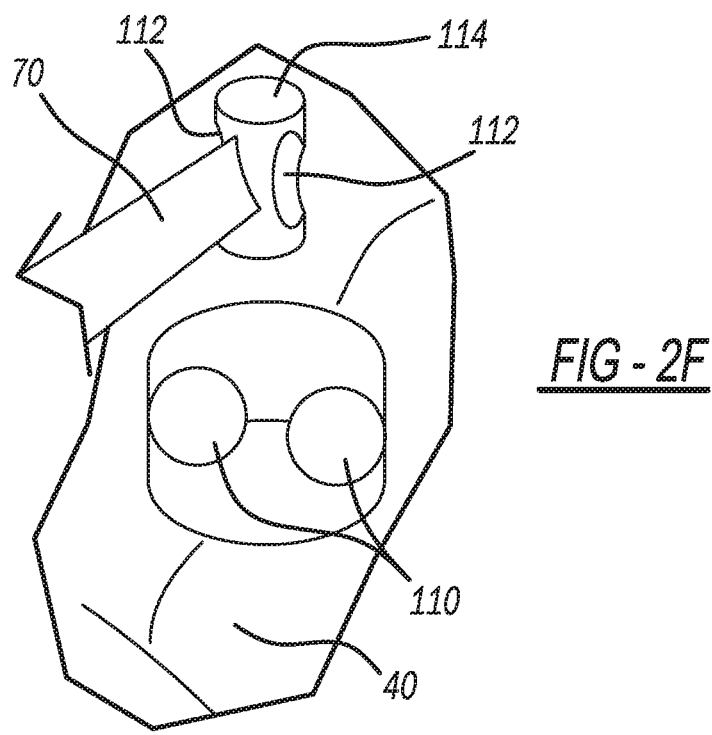
FIG. 2F illustrates still another exemplary coupling between the motor mount and the case of the blower assembly.

With reference to FIG. 2F, another exemplary coupling for coupling the motor support 70 to the airflow generator housing 40 is illustrated. At the housing 40 are a pair of spherical members 110, which are sized and shaped to be received within recesses 112 defined within end member 114, which is at an end of the motor support 70. The end member 114 is pressed between the spherical members 110 so that the spherical members 110 sit within, and lock within, the recesses 112 to secure the motor support 70 to the airflow generator housing 40.

Figure 2G:
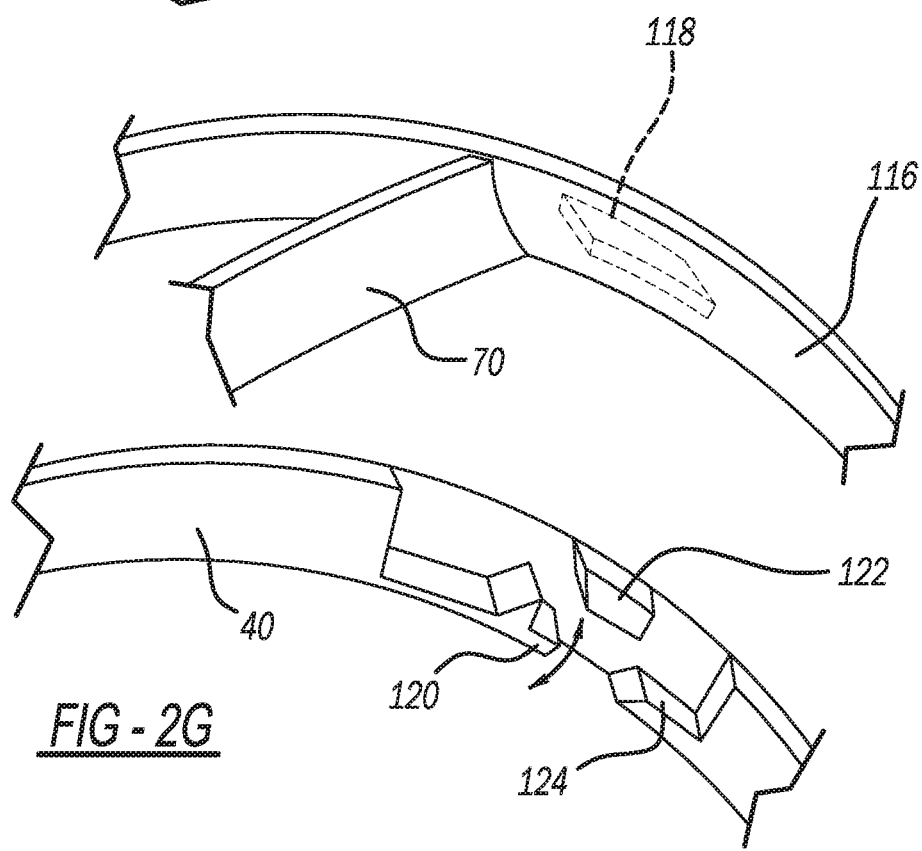
FIG. 2G illustrates a further exemplary coupling between the motor mount and the case of the blower assembly.

With reference to FIG. 2G, the motor supports 70 may extend outward from the motor housing 62 and be connected to an annular ring 116. A plurality of tabs 118 are spaced apart about the annular ring 116 and extend from the annular ring 116. At the airflow generator housing 40 are a plurality of spaced apart flaps 120. The number of flaps 120 corresponds to the number of tabs 118. Associated with each flap 120 is a pair of flanges 122 and 124. FIG. 2G illustrates one exemplary tab 118 and one corresponding flap 120, along with exemplary flanges 122 and 124 associated with the flap 120. The flaps 120 and flanges 122, 124 may be integral with the airflow generator housing 40, or attached thereto in any suitable manner. The tab 118 is slid over the flap 120 to secure the tab 118 between the flanges 122 and 124, which locks the annular ring 116 to the airflow generator housing 40.

In addition to the coupling arrangements of FIGS. 2C, 2D, 2E, 2F, and 2G, any other suitable coupling arrangement or device may be used, such as any other suitable fastener, snap-type fitting, twist-lock fitting, threaded coupling etc. For example, one skilled in the art will appreciate that the coupling arrangements described herein and illustrated in FIGS. 3B, 3C, 3D, and 3E may be used as well.

The motor supports 70 may have an airfoil shape in cross-section, as illustrated in FIG. 2H. This airfoil shape advantageously avoids boundary layer separation and thereby increases the amount of airflow contact with the motor supports 70. The increased airflow contact resulting from the airfoil shape reduces pressure drop and advantageously reduces the amount of noise generated by the blower assembly 20.

Figure 3A:
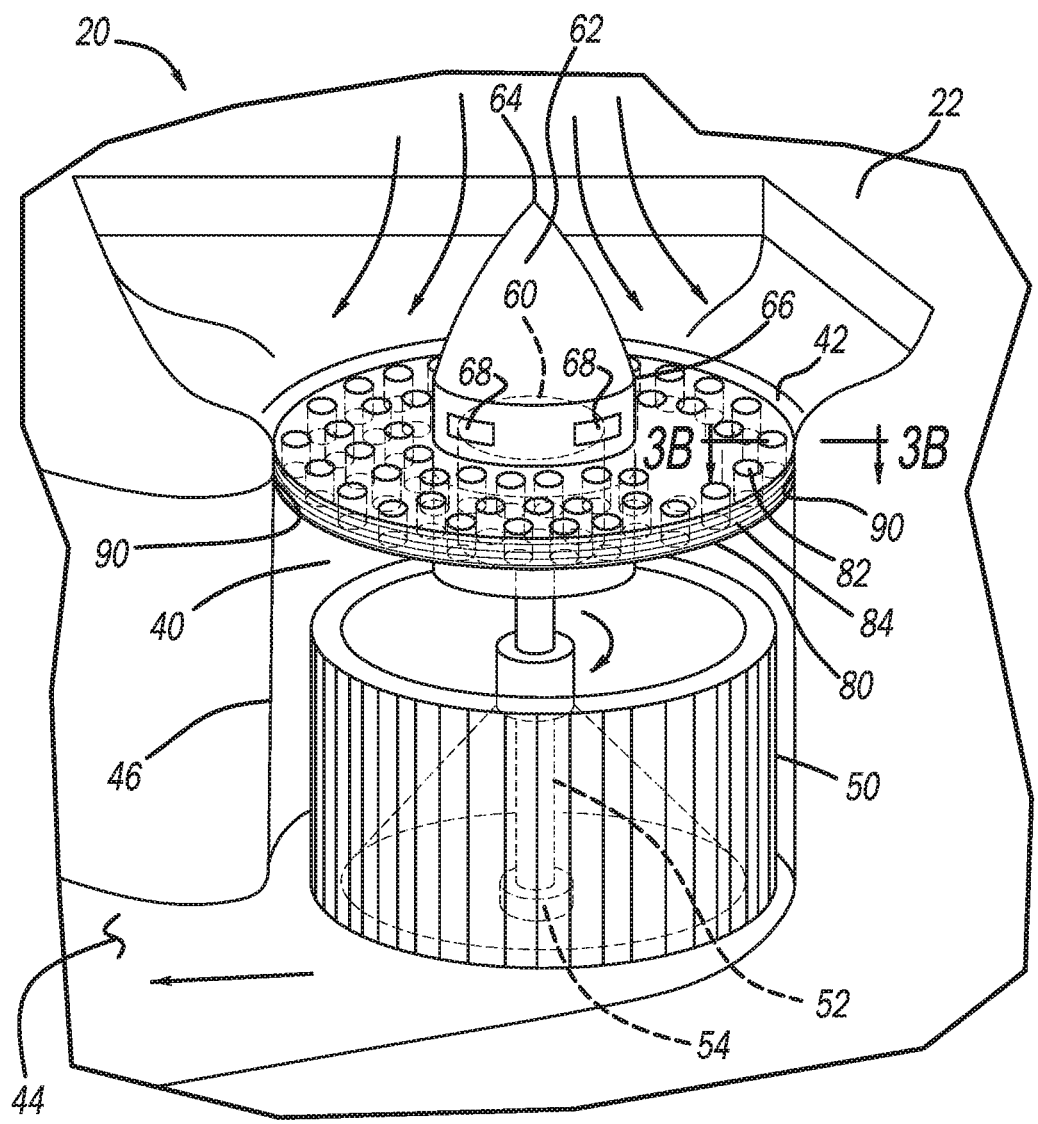
FIG. 3A illustrates another exemplary motor mount arrangement in accordance with the present disclosure.
Figure 3B:
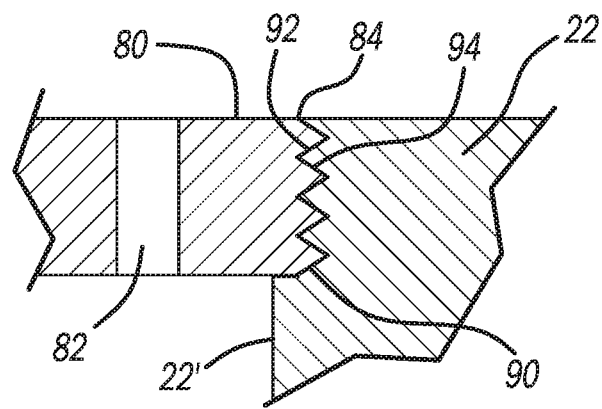
FIG. 3B is a cross-sectional view taken along line 3B-3B of FIG. 3A illustrating an exemplary coupling between the motor mount and the case of the blower assembly.

In place of the motor supports 70, any other suitable motor support may be used, such as the motor support 80 of FIG. 3A. The motor support 80 is a plate defining a plurality of airflow apertures 82. Any suitable number of airflow apertures 82 may be included, and the airflow apertures 82 may have any suitable shape and size to produce laminar airflow. Suitable shapes include, but are not limited to, the following: slots, circular, mesh, honeycomb, etc. As airflow passes through the apertures 82, the apertures 82 advantageously convert turbulent airflow to laminar airflow, which reduces the occurrence of low frequency rumble noises caused by airflow separation and airflow recirculation.

The motor support 80 is secured to the motor housing 62 and to the case 22 in any suitable manner. For example, an outer portion of the motor support 80 is connected to the case 22 with any suitable coupler. Suitable couplers include, but are not limited to, a threaded interface 90, fasteners, snap locks, twist locks, etc. With additional reference to FIG. 3B, the threaded interface 90 includes first threads 92 on an outer edge 84 of the motor support 80, which mate with second threads 94 of the case 22 to secure the motor support 80 to the case 22. The first threads 92 extend about at least a portion of the outer edge 84, and may extend about an entirety of the outer edge 84. The second threads 94 extend about an interior of the case 22, but are interrupted at the outlet 44. The case 22 may include a bead or stop 22' that protrudes into the airflow generator housing 40 from a remainder of the case 22. The motor support 80 contacts the bead 22' after the motor support 80 has been screwed all the way into position. Contact between the motor support 80 and the bead 22' prevents the motor support 80 from being screwed too far into the airflow generator housing 40.

To service or replace the motor 60 and/or the airflow generator 50, the motor support 80 may be unscrewed from cooperation with the case 22. The motor 60, the airflow generator 50, and/or other components may be replaced or serviced, and then the motor support 80 (or a replacement motor support 80) may be screwed into cooperation with the case 22. Similarly, the motor support 70 may be decoupled from the case 22 to service or replace the motor 60 and/or the airflow generator 50.

Figure 3C:
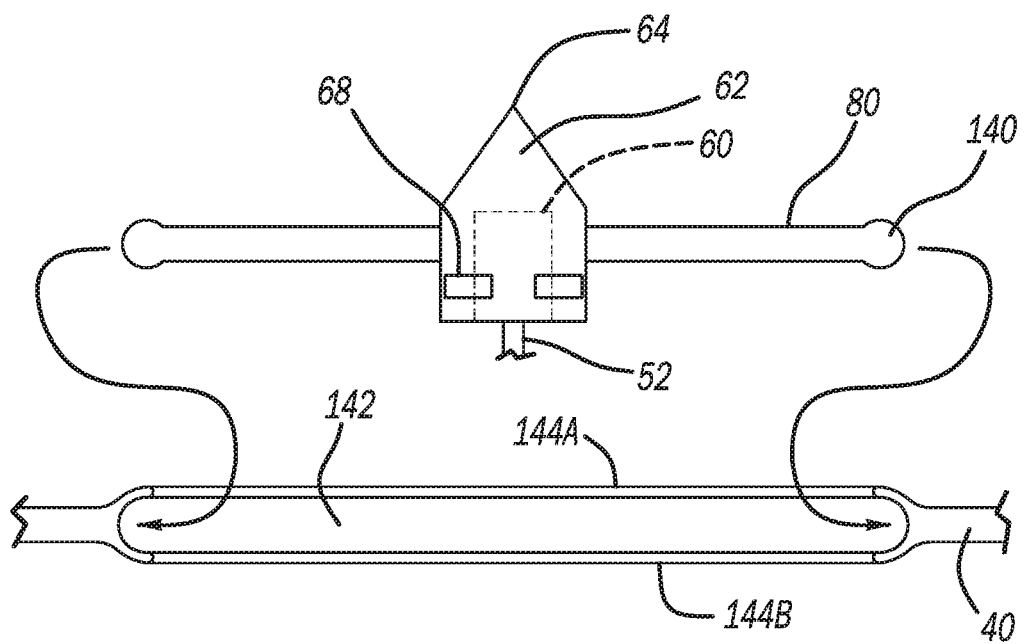
FIG. 3C illustrates another exemplary coupling between the motor mount and the case of the blower assembly.

FIG. 3C illustrates another exemplary coupling for mounting the motor support 80 to the airflow generator housing 40. In this example, the motor support 80 includes a bulbous outer portion 140, which extends around an outer circumference of the motor support 80. A receptacle 142 is defined by annular flanges 144A and 144B, which may be flexible. The flanges 144A and 144B are mounted to the airflow generator housing 40 in any suitable manner. The bulbous outer portion 140 is slid or "snapped" over the annular flange 144A and into the receptacle 142 to secure the motor support 80 to the airflow generator housing 40.

Figure 3D:
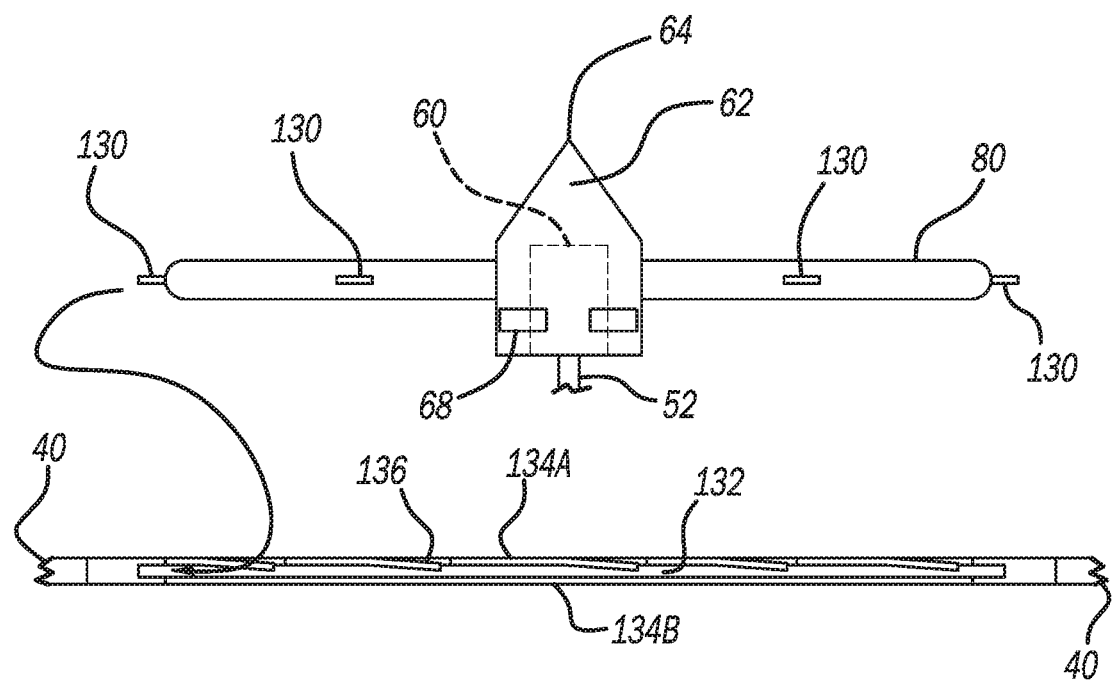
FIG. 3D illustrates an additional exemplary coupling between the motor mount and the case of the blower assembly.
Figure 3E:
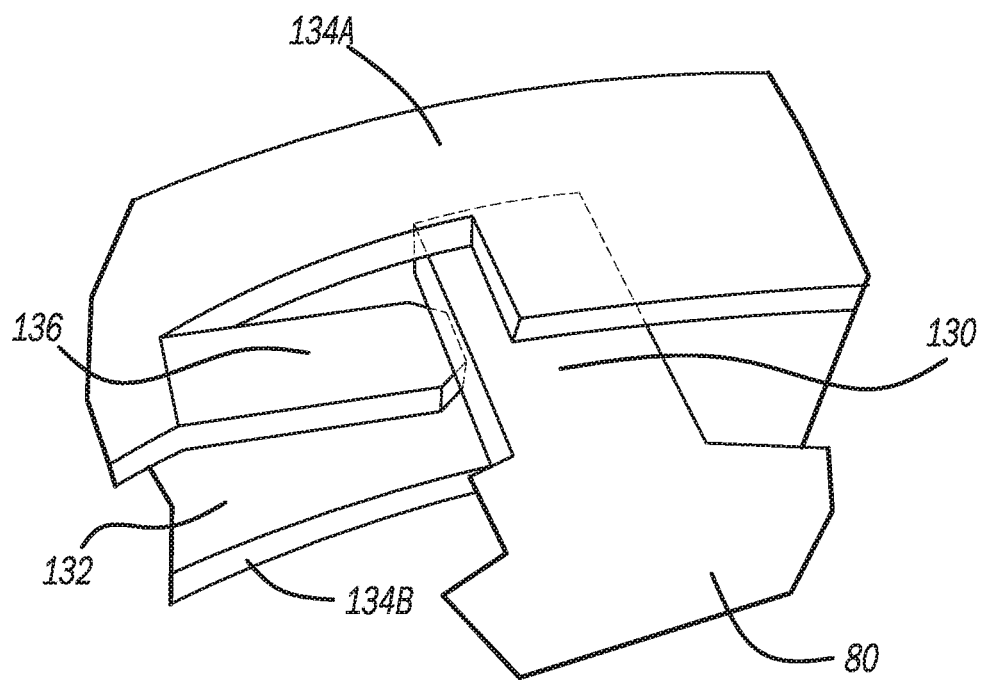
FIG. 3E illustrates the exemplary coupling of FIG. 3D in additional detail.

FIG. 3D and FIG. 3E illustrate an additional exemplary coupling for mounting the motor support 80 to the airflow generator housing 40. In this example, the motor support 80 includes a plurality of tabs 130 extending outward from an outer periphery of the motor support 80. Mounted about an inner circumference of the airflow generator housing 40 is a slot 132 defined by an upper flange 134A and a lower flange 1348. The upper flange 134A includes a plurality of flexible flaps 136, which are spaced apart about the upper flange 134A. The tabs 130 are slid over the flexible flaps 136 and into the slot 132 to secure the motor support 80 to the airflow generator housing 40.

The motor support 80 may be mounted at or to the airflow generator housing 40 in any other suitable manner as well. For example, any of the couplings illustrated in FIGS. 2C, 2D, 2E, 2F, and 2G may be used. To use the couplings of FIGS. 2C, 2D, 2E, 2F, and 2G to mount the motor support 80, the illustrated motor supports 70 may take the form of shorter support stays extending from the outer edge 84 of the motor support 80.

The present disclosure thus includes a blower assembly 20 for a vehicle HVAC system 10 that provides numerous advantages. For example, by arranging the motor 60 on the upstream side of the airflow generator 50 and completely within the case 22, the motor 60 is positioned further away from the vehicle passenger cabin as compared to current HVAC motors. As a result, blower noise perceptible to occupants of the passenger cabin is reduced. Airflow to the airflow generator 50 passes over the motor housing 62 and into the inlets 68, which cools the motor 60. As a result, there is no need for a separate cooling tube/channel for the motor 60. The shape of the upstream end 64 of the motor housing 62, and the airflow apertures 82 defined by the motor support 80, advantageously convert turbulent airflow to laminar airflow, which reduces airflow separation and recirculation, thereby reducing undesirable rumble noises. The airfoil-shaped motor supports 70 advantageously reduce the pressure drop, such as by eliminating flow separation, which makes the blower assembly 20 quieter. The blower assembly 20 may be provided as a retrofit for existing HVAC systems, or may be provided as original equipment as well. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A blower assembly for a heating, ventilation, and air conditioning (HVAC) system, the blower assembly comprising:
    a case defining an airflow inlet, an airflow outlet, and a receptacle;
    an airflow generator mounted within the case, the airflow generator draws airflow into the case through the airflow inlet, directs airflow through the case, and pushes airflow out of the case through the airflow outlet;
    a motor connected to the airflow generator to rotate the airflow generator, the motor is entirely within the case and is mounted on an upstream side of the airflow generator with respect to direction of airflow generated by the airflow generator through the case; and a motor support configured to support the motor in the case, the motor support including a bulbous portion in cooperation with the receptacle.

2. The blower assembly of claim 1, wherein the motor is within a motor housing defining inlets configured to allow airflow into the motor housing to cool the motor.

3. The blower assembly of claim 2, wherein an upstream end of the motor housing is shaped to convert turbulent airflow to laminar airflow.

4. The blower assembly of claim 3, wherein the upstream end of the motor housing is one of rounded, cone-shaped, or egg-shaped.

5. The blower assembly of claim 1, further comprising a shaft extending from the motor and coupled to the airflow generator, the shaft is received within a bearing on a side of the airflow generator opposite to the motor; wherein rotation of the shaft by the motor rotates the airflow generator.

6. The blower assembly of claim 1, wherein the case includes a scroll portion.

7. The blower assembly of claim 1, wherein downstream of the case is at least one of an evaporator and heater core of the HVAC system.

8. The blower assembly of claim 1, wherein the motor is mounted on the upstream side of the airflow generator by a support plate.

9. The blower assembly of claim 8, wherein the support plate defines a plurality of airflow apertures through which airflow flows to the airflow generator, the airflow apertures convert turbulent airflow to laminar airflow as the airflow passes through the airflow apertures.

10. The blower assembly of claim 1, wherein the bulbous portion cooperates with the receptacle by way of a snap lock.

11. A blower assembly of a heating, ventilation, and air conditioning (HVAC) system for a vehicle, the blower assembly comprising:

a case defining a fresh air inlet configured to receive airflow from outside of the vehicle, a recirculation air inlet configured to receive airflow from inside of a passenger cabin of the vehicle, and a receptacle;

an airflow generator within the case;

a motor for rotating the airflow generator, the motor is entirely within the case between the airflow generator and each of the fresh air inlet and the recirculation air inlet; and a motor support that supports the motor over the airflow generator in a path of airflow to the airflow generator, the motor support includes a support plate having a bulbous outer portion configured to be received within the receptacle to connect the support plate to the case;

wherein the motor is mounted on an upstream side of the airflow generator.

12. The blower assembly of claim 11, wherein the case includes a scroll-shaped portion in which the airflow generator is located.

* * * * *